(No Model.) 2 Sheets—Sheet 2.

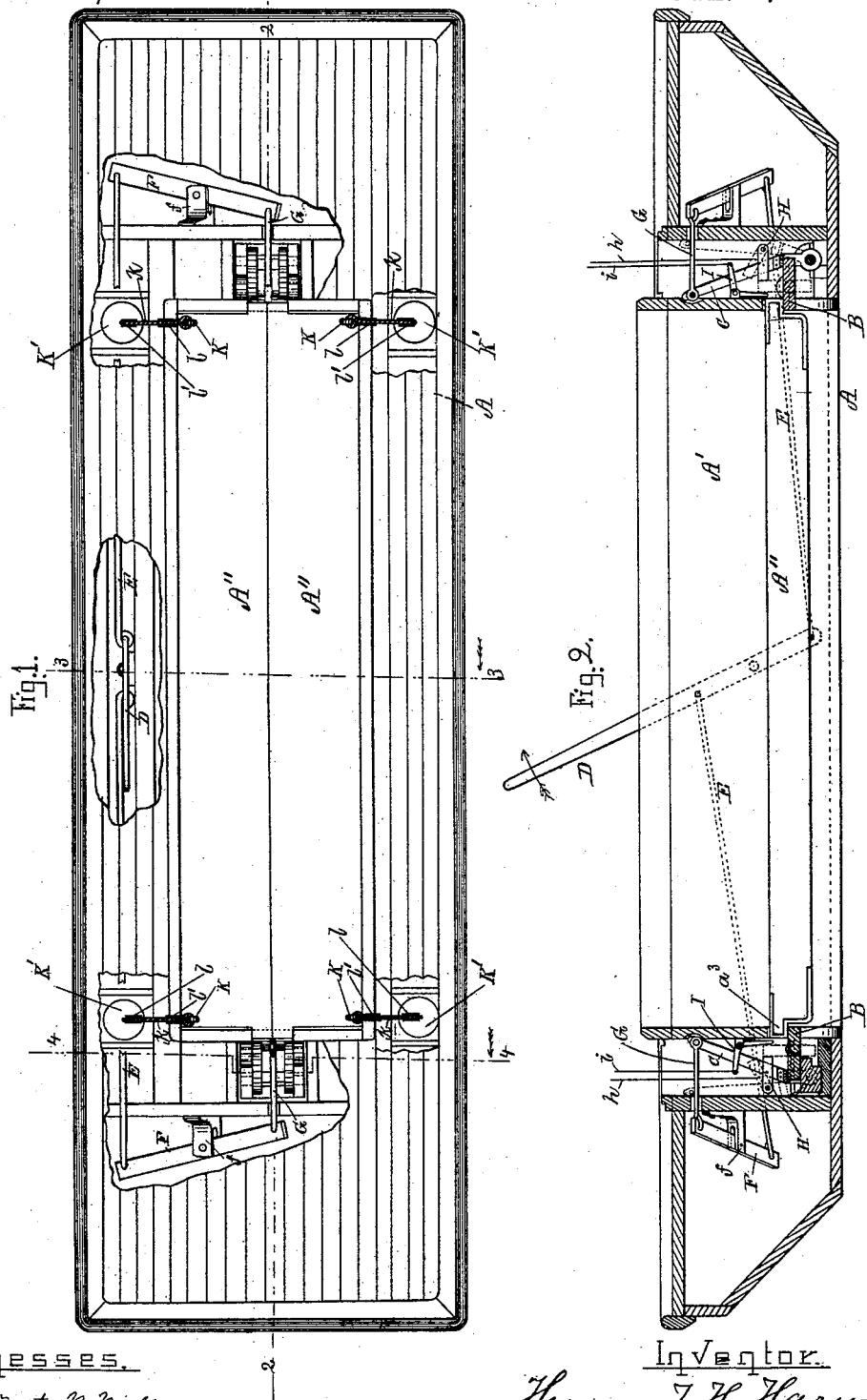

T. T. H. HARWOOD.
DUMPING SCOW.

No. 489,434. Patented Jan. 3, 1893.

Witnesses.
Lauritz N. Möller
Chas. B. Brooks.

Inventor.
Thomas T. H. Harwood
by Alban Andrew his atty

THE NORRIS PETERS CO., PHOTO-LITHO., WASHINGTON, D. C.

UNITED STATES PATENT OFFICE.

THOMAS T. H. HARWOOD, OF ROCKPORT, MASSACHUSETTS.

DUMPING-SCOW.

SPECIFICATION forming part of Letters Patent No. 489,434, dated January 3, 1893.

Application filed July 25, 1892. Serial No. 441,130. (No model.)

*To all whom it may concern:*

Be it known that I, THOMAS T. H. HARWOOD, a citizen of the United States, and a resident of Rockport, in the county of Essex and State of Massachusetts, have invented new and useful Improvements in Dumping-Scows, of which the following, taken in connection with the accompanying drawings, is a specification.

This invention relates to improvements in self dumping scows and it is carried out as follows, reference being had to the accompanying drawings, wherein—

Figure 3:
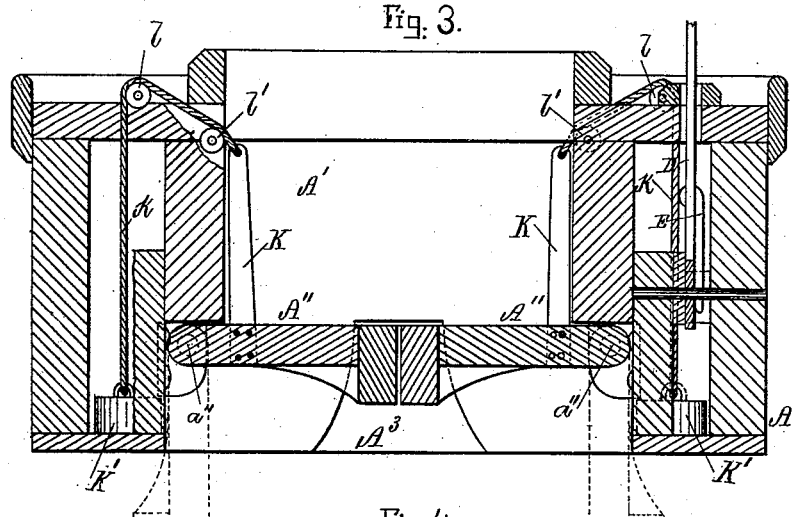
Figure 4:
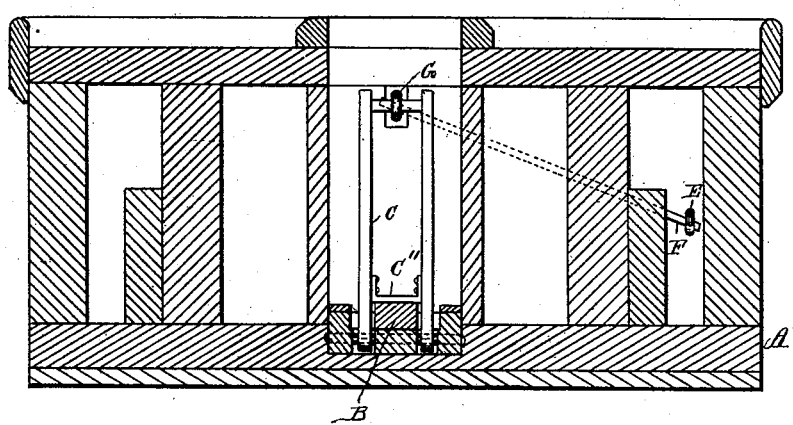
Figure 5:
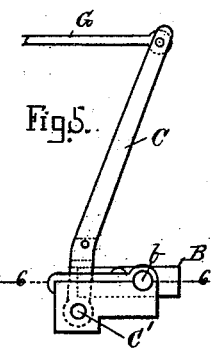
Figure 6:
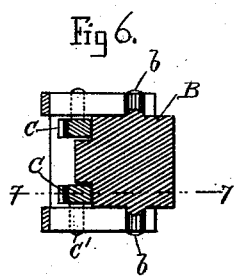
Figure 7:
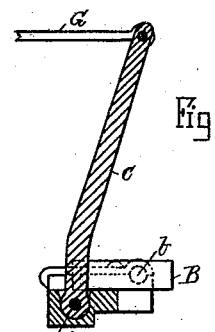

Figure 1 represents a plan view of the improved scow showing portions of the deck as broken away; Fig. 2 represents a longitudinal section on the line 2—2 in Fig. 1; Fig. 3 represents an enlarged cross-section on the line 3—3 in Fig. 1; Fig. 4 represents an enlarged cross-section on the line 4—4 in Fig. 1; Fig. 5 represents a detail side elevation of one of the locking pawls and lever for holding and releasing said pawl; Fig. 6 represents a horizontal section on the line 6—6 in Fig. 5; and Fig. 7 represents a vertical section on the line 7—7 in Fig. 6.

Similar letters refer to similar parts wherever they occur on the differents parts of the drawings.

A is the scow body having a central well A' open from top to bottom as is usual in self-dumping scows.

A'', A'', are the doors hinged at $a''$, $a''$, to opposite sides of the lower portion of the well as is common in devices of this kind.

$A^3$, $A^3$ are longitudinal strengthening ribs at the meeting edges of the hinged doors for the purpose of strengthening the latter at the portions where the greatest strain of the load is encountered.

$a^3$, $a^3$ are end projections on the ribs $A^3$, $A^3$, or on the ends of the doors A'', A'', which are normally supported on pivoted pawls or tripping dogs B, B, of which there are two, one at each end of the well A' as shown. Each dog B is pivoted at $b$, $b$, in suitable bearings secured to the scow frame or body and is held in the locked position shown in the drawings by means of a lever C, which is pivoted in its lower end (at C') and has a lateral projection C'' against which the outer end of the dog B is held when the ends of the doors A'', A'', are resting on the inner ends of said dogs B, B.

The two levers C, C, are connected for simultaneous operations to a single hand lever D as shown in Figs. 1 and 2. The lever D may be pivoted to any suitable part of the scow and is preferably connected to the levers C, C, by means of links E, E, each of which is connected in one end to the lever D and in the other to a pivoted rock lever F pivoted at $f$, and connected by means of a link G to the upper end of the lever C as fully shown in Figs. 1 and 2.

If it is desired to unload the scow all that is necessary to do is to move the lever D in the direction shown by arrow upon it by which the levers C, C, are swung outward sufficiently to release the dogs B, B, which are then free to swing to vertical positions thus liberating the doors A'', A'' and allowing the free discharge of the load.

After the load is discharged, the doors, owing to their buoyancy will automatically swing to their original closed positions and be locked by means of the pawls and levers above mentioned.

It is desirable to hold the dogs B, B, in a vertical position during the closing movement of the doors to allow the end projections $a^3$, $a^3$, to pass freely by said dogs and for this purpose, I may use any desired mechanism for temporarily holding each of said dogs in a vertical position after the load has been discharged and until the doors are again securely locked; for this purpose I have shown in Fig. 2 of the drawings, a pivoted pawl H which prevents the dog B from swinging into locked position until so desired by the operator.

The pawl H may be raised by means of a rod or chain $h$ attached to it, or in any other suitable manner.

After the doors have been closed and the pawls H, H, raised so as to liberate the dogs B, B, the latter may be swung into locking positions relative to the doors and this may be done in any suitable manner; in the drawings I have shown for this purpose a knee lever I pivoted to the scow body and provided with an upwardly projecting link or rod for its manipulation. By pulling on the rods $i, i$, the dogs B, B, are tripped and swung into their orignal locking positions shown in full lines in Fig. 2 after which the lever D is swung to its original position shown in said Fig. 2, causing the levers C, C, to lock the dogs B, B, in position for holding the doors A″, A″, closed while the scow is being loaded and transported and until the load is to be discharged and so on.

When the doors are hung above the water line of the scow when empty, or are lacking in sufficient buoyancy to return to their closed positions by their own floatability, it will be necessary to employ additional means for closing the doors after the load has been discharged and for this purpose I have shown in the drawings levers K K secured to the doors A″, A″ and connected by means of chains or ropes k, k going over pulleys l, l′ to balance weights K′ K′ as fully shown in Figs. 1 and 3.

Having thus fully described the nature, construction and operation of my invention, I wish to secure by Letters Patent and claim:

1. The combination with a scow having a well, and doors hinged to opposite sides of the lower part of the well, of movable dogs mounted on the scow near the ends of the doors for supporting the latter in their closed position, a device arranged on the scow in juxtaposition to each dog for holding the latter in position to support a door, and lever mechanism carried by the scow and connected with the said dog-holding devices, for simultaneously operating them and releasing the dogs, substantially as described.

2. The combination with a scow having a well, and doors hinged to opposite sides of the lower part of the well, of pivoted swinging dogs mounted on the scow for supporting the doors in their closed position, swinging levers pivoted to the scow and acting on the dogs to rigidly hold them in position to support the doors when closed, and an operating lever connected with the dog holding levers for simultaneously moving the latter to release the dogs, substantially as described.

3. The combination with a scow having a well, and doors hinged to opposite sides of the lower part of the well, of pivoted swinging dogs mounted on the scow for supporting the doors in their closed position, a lever mechanism carried by the scow and connected with the dogs for simultaneously releasing them from engagement with the doors, and levers arranged in juxtaposition to the dogs for restoring them into position for supporting the doors when closed, substantially as described.

4. The combination with a scow having a well, and doors hinged to opposite sides of the lower part of the well, of pivoted, swinging dogs mounted on the scow for supporting the doors in their closed position, pivoted pawls for holding the dogs in their unlocked position, means for operating the pawls, levers pivoted to the scow for restoring the dogs into position for supporting the doors when closed, and a lever mechanism mounted on the scow for holding and simultaneously releasing the door supporting dogs, substantially as described.

5. The combination with a scow having a well, and doors hinged to opposite sides of the lower part of the well, of levers secured to the doors, balance weights having flexible connections with the levers, devices for holding the doors in their closed position, and lever mechanism mounted on the scow for simultaneously operating the door holding devices to release the doors, substantially as described.

In testimony whereof I have signed my name to this specification, in the presence of two subscribing witnesses, on this 21st day of July, A. D. 1892.

THOMAS T. H. HARWOOD.

Witnesses:
ALBAN ANDRÉN,
JOSEPH F. HANKINS.